(12) United States Patent
Chang

(10) Patent No.: US 10,953,367 B2
(45) Date of Patent: Mar. 23, 2021

(54) METHOD OF OSMOTIC PRESSURE FREE REVERSE OSMOSIS FOR ENRICHING SOLUTE-CONTAINING SOLUTION TO HIGH CONCENTRATION

(71) Applicant: LAB TO MARKET INC., Seoul (KR)

(72) Inventor: Ho Nam Chang, Seoul (KR)

(73) Assignee: LAB TO MARKET INC., Seoul (KR)

(*) Notice: Subject to any disclaimer, the term of this patent is extended or adjusted under 35 U.S.C. 154(b) by 322 days.

(21) Appl. No.: 15/744,945

(22) PCT Filed: Jul. 25, 2016

(86) PCT No.: PCT/KR2016/008104
§ 371 (c)(1),
(2) Date: Jan. 15, 2018

(87) PCT Pub. No.: WO2017/018764
PCT Pub. Date: Feb. 2, 2017

(65) Prior Publication Data
US 2018/0207584 A1    Jul. 26, 2018

(30) Foreign Application Priority Data

Jul. 24, 2015  (KR) .................. 10-2015-0105055
Jul. 25, 2016  (KR) .................. 10-2016-0094090

(51) Int. Cl.
*B01D 61/02*    (2006.01)
*C02F 1/44*    (2006.01)
(Continued)

(52) U.S. Cl.
CPC ......... *B01D 61/025* (2013.01); *B01D 61/022* (2013.01); *C02F 1/441* (2013.01);
(Continued)

(58) Field of Classification Search
None
See application file for complete search history.

(56) References Cited

U.S. PATENT DOCUMENTS 5,104,544 A * 4/1992 Shimizu .................. C01F 17/10
                                                      210/638
2004/0055955 A1 * 3/2004 Davis ...................... B01D 61/44
                                                      210/652
(Continued)

FOREIGN PATENT DOCUMENTS

JP    4813278 A    4/1978
JP    2002113465 A    4/2002
(Continued)

OTHER PUBLICATIONS

Jung, K., et al., "Permeation characteristics of volatile fatty acids solution by forward osmosis", "Process Biochemistry", Apr. 2015, pp. 669-677, vol. 50, No. 4.
(Continued)

*Primary Examiner* — Krishnan S Menon
*Assistant Examiner* — Brad Gordon
(74) *Attorney, Agent, or Firm* — Hultquist, PLLC; Steven J. Hultquist

(57) ABSTRACT

The present invention relates to a method of concentrating an aqueous solution by low pressure under a zero osmotic pressure difference condition, and more particularly to a method of concentrating a solute-containing aqueous solution by low pressure under a zero osmotic pressure difference condition. When the method of the present invention is used, there are advantages in that energy consumption is low, and an aqueous solution can be concentrated until it can reach the maximum solute concentration or a solute concentration of 100%, without having to use an extraction
(Continued)

solvent. In addition, there is an advantage in that the need to use a separate osmotic pressure draw solution is eliminated.

9 Claims, 6 Drawing Sheets

(51) Int. Cl.
C02F 103/08 (2006.01)
C02F 1/62 (2006.01)

(52) U.S. Cl.
CPC .............. *C02F 1/62* (2013.01); *B01D 61/027* (2013.01); *B01D 2257/204* (2013.01); *B01D 2257/60* (2013.01); *B01D 2311/06* (2013.01); *B01D 2311/14* (2013.01); *B01D 2311/246* (2013.01); *B01D 2311/25* (2013.01); *C02F 1/442* (2013.01); *C02F 2103/08* (2013.01); *C02F 2301/06* (2013.01)

(56) References Cited

U.S. PATENT DOCUMENTS

| | | | |
|---|---|---|---|
| 2010/0032377 A1 | 2/2010 | Wohlert | |
| 2010/0294718 A1* | 11/2010 | Treyvaud | B01D 61/022 210/652 |
| 2012/0118826 A1 | 5/2012 | Liberman et al. | |
| 2012/0267307 A1 | 10/2012 | McGinnis | |
| 2012/0267308 A1 | 10/2012 | Carmignani et al. | |
| 2012/0311822 A1* | 12/2012 | Culkin | B01D 9/0054 23/295 R |

FOREIGN PATENT DOCUMENTS

| | | |
|---|---|---|
| JP | 2003176774 A | 6/2003 |
| JP | 2003200160 A | 7/2003 |
| JP | 2003326259 A | 11/2003 |
| KR | 10-2012-0050897 A | 5/2012 |
| KR | 10-1229482 B1 | 2/2013 |
| WO | WO2008149324 A1 | 12/2008 |
| WO | 2014123339 A1 | 8/2014 |

OTHER PUBLICATIONS

Lewis, G. N., "The Osmotic Pressure of Concentrated Solutions, and the Laws of the Perfect Solution", "Journal of the American Chemical Society", May 1908, pp. 668-683, vol. 30, No. 5.

Loeb, S., "Production of Energy from Concentrated Brines by Pressure-Retarded Osmosis: I. Preliminary Technical and Economic Correlations", "Journal of Membrane Science", Dec. 1976, pp. 49-63, vol. 1.

Loeb, S., "The Loeb-Sourirajan Membrane: How it Came About, ACS Symposium Series vol. 153", "Synthetic Membranes: Volume I: Desalination", May 21, 1981, pp. 1-9, Publisher: American Chemical Society, Published in: Washington, D.C.

* cited by examiner

FIG. 5

| Sales | Total W | High-S | Low-S | Total-water | "+3%-W" | "-3%-W" | High3% | low 3% | Net W-more | Kwh | A | T |
|---|---|---|---|---|---|---|---|---|---|---|---|---|
| 2.6470E-01 | 8.3336E+01 | | | | | | | | | | | |
| 2.4000E-01 | 9.5000E+01 | 5.7448E+01 | 3.7352E+01 | 9.5000E+01 | 4.1670E+01 | 5.3330E+01 | 2.6470E-01 | 2.1000E-01 | 1.5972E-01 | 1.3315E-02 | 1.5312E+01 | 9.3300E-02 |
| 2.1000E-01 | 1.1286E+02 | 6.0769E+01 | 5.2088E+01 | 1.1286E+02 | 4.7500E+01 | 6.5357E+01 | 2.4000E-01 | 1.8000E-01 | 1.3200E-01 | 1.1038E-02 | 1.1667E+01 | 1.4286E-01 |
| 1.8000E-01 | 1.3667E+02 | 7.9222E+01 | 5.6944E+01 | 1.3667E+02 | 5.6429E+01 | 8.0238E+01 | 2.1000E-01 | 1.5000E-01 | 3.3330E-01 | 1.9411E-01 | 1.4000E+01 | 1.4286E-01 |
| 1.5000E-01 | 1.7000E+02 | 1.0300E+02 | 6.6000E+01 | 1.7000E+02 | 6.8333E+01 | 1.0167E+02 | 1.8000E-01 | 1.2000E-01 | 3.3867E-01 | 2.8056E-01 | 1.5000E+01 | 1.6667E-01 |
| 1.2000E-01 | 2.2000E+02 | 1.3750E+02 | 8.2500E+01 | 2.2000E+02 | 8.5000E+01 | 1.3500E+02 | 1.5000E-01 | 9.0000E-02 | 5.2500E-01 | 4.3750E-01 | 1.6667E+01 | 5.0000E-01 |
| 9.0000E-02 | 3.0333E+02 | 2.0222E+02 | 1.0111E+02 | 3.0333E+02 | 1.4667E+02 | 1.5667E+02 | 1.3000E-01 | 6.0000E-02 | 5.5500E-01 | 4.6302E-01 | 2.0000E+01 | 2.5000E-01 |
| 6.0000E-02 | 4.7000E+02 | 3.2845E+02 | 1.4167E+02 | 4.7000E+02 | 1.5166E+02 | 3.1834E+02 | 9.0000E-02 | 3.3835E-02 | 1.7676E-01 | 1.4733E-01 | 2.3334E+01 | 3.3333E-01 |
| | | | | | | | | | 3.7100E-02 | 3.0922E-01 | | |

FIG. 6

| %-NaCl | 0.06 | 0.09 | 0.12 | 0.15 | 0.18 | 0.21 | 0.24 | 0.2647 | "R=Feed Stream recycle ratio" |
|---|---|---|---|---|---|---|---|---|---|
| Total Salt | 30 | 30 | 30 | 30 | 30 | 30 | 30 | 30 | |
| Total Water | 470 | 303.3333 | 220 | 170 | 136.6667 | 112.8571 | 95 | 83.33595 | |
| Period Water | 166.6667 | 83.33333 | 50 | 33.33333 | 23.80952 | 17.85714 | 11.66415 | 8334 | 470.0041 |
| osm P | 50.467 | 80.611 | 114.606 | 152.864 | 195.745 | 243.529 | 296.379 | 343.707 | |
| | 27 | 27 | 27 | 27 | 27 | 27 | 27 | 27 | |
| | 0.055253 | 0.083851 | 0.113139 | 0.143111 | 0.173821 | 0.205288 | 0.237537 | 0.26469 | |
| | 461.6652 | 294.9985 | 211.6652 | 161.6652 | 128.3319 | 104.5223 | 86.66541 | 75.00227 | WATER |
| | 24 | 24 | 24 | 24 | 24 | 24 | 24 | 24 | R=0.9 |
| | 453.3328 | 303.3333 | 220 | 170 | 136.6667 | 18.85714 | 34.33333 | 66.66868 | |
| | 0.050279 | 0.07352 | 0.098361 | 0.123711 | 0.149378 | 0.56 | 0.411429 | 0.2647 | R=0.8 |
| | 21 | | | | | | | | |
| | 444.998 | 278.3313 | 194.998 | 144.998 | 111.6647 | 87.85514 | 69.998 | 59.3351 | R=0.7 |
| | 0.045065 | 0.070156 | 0.097223 | 0.126508 | 0.158294 | 0.192917 | 0.230774 | 0.2647 | |
| | 18 | | | | | | | | |
| | 436.6657 | 269.999 | 186.6657 | 136.6657 | 103.3323 | 79.5228 | 61.66566 | 50.00151 | R=0.6 |
| | 0.03959 | 0.0625 | 0.087948 | 0.11638 | 0.148353 | 0.184572 | 0.225944 | 0.2647 | |
| | 15 | | | | | | | | R=0.5 |
| Total Water | 428.3321 | 261.6654 | 178.3321 | 128.3321 | 94.99874 | 71.18922 | 53.33207 | 41.66793 | |
| %-NaCl | 0.033835 | 0.054217 | 0.077587 | 0.104652 | 0.136365 | 0.174036 | 0.219516 | 0.2647 | |
| osm P | 27.02384 | 45.10847 | 67.72787 | 96.96186 | 134.9801 | 186.9118 | 258.7318 | 343.707 | |
| Δ Osmotic Pressure | 23.44316 | 35.50253 | 46.87333 | 55.90214 | 60.7649 | 56.61623 | 36.62717 | 0 | |
| Kwh | 0.108533 | 0.082182 | 0.065102 | 0.051761 | 0.040188 | 0.028083 | 0.011867 | 0.38772 | |

METHOD OF OSMOTIC PRESSURE FREE REVERSE OSMOSIS FOR ENRICHING SOLUTE-CONTAINING SOLUTION TO HIGH CONCENTRATION

CROSS-REFERENCE TO RELATED APPLICATIONS

This application is a U.S. national phase under the provisions of 35 U.S.C. § 371 of International Patent Application No. PCT/KR2016/008104 filed Jul. 25, 2016, which in turn claims priority of Korean Patent Application No. 10-2015-0105055 filed Jul. 24, 2015 and Korean Patent Application No. 10-2016-0094090 filed Jul. 25, 2016. The disclosures of such international patent application and Korean priority patent applications are hereby incorporated herein by reference in their respective entireties, for all purposes.

GOVERNMENT SUPPORT

This patent application was supported by the Development project on Internet of Things (IoT) convergence technology for seawater desalination using osmotic pressure free ($\Delta\pi=0$) reverse osmosis (NRF-2017008625) of the Ministry of Science and ICT through the National Research Foundation (NRF) of Korea.

TECHNICAL FIELD

The present invention relates to a method of concentrating a solute-containing aqueous solution to a high solute concentration, and more particularly to a method of concentrating a solute-containing aqueous solution to a high concentration by removing water from the aqueous solution by a hydraulic membrane process under a zero osmotic pressure difference condition.

BACKGROUND ART

Table 1 below compares the advantages and disadvantages of reverse osmosis (RO) that is most frequently used in seawater desalination processes, forward osmosis (FO) in which water is recovered from seawater or sewage by a high-osmotic pressure solution in a draw chamber in order to separate an osmotic pressure draw substance and water and a draw solution is recycled, and a method of concentrating a solute-containing aqueous solution to a high concentration by a hydraulic membrane process under a zero osmotic pressure difference condition.

RO has disadvantages in that it shows a solvent recovery rate of only 50%, and above all, it should be operated at a pressure of 343.070 bar in 3%-NaCl saturated solution (26.47%) in order to recover 100% of a solvent and a solute. FO has the advantage of operating at atmospheric pressure, but has disadvantages in that a draw solution should be regenerated and it is not easy to recover the solute if the solute flows from the feed to the draw solution (Jung et al. Process Biochemistry (2015) 50(4) 669-677). On the other hand, the method of concentrating a solute-containing aqueous solution to a high concentration by a hydraulic membrane process under a zero osmotic pressure difference condition ($\Delta\pi=0$ process) has a difficulty in overcoming the osmotic pressure difference that occurs as the process progresses between the feed chamber and the draw chamber.

TABLE 1

Advantages and disadvantages of the method of concentrating a solute-containing aqueous solution to high concentration

| Items for comparison | RO | FO | $\Delta\pi = 0$ process |
|---|---|---|---|
| Osmotic pressure ($\pi f - \pi d$) = $\Delta\pi$ | feed: high draw: zero $\Delta\pi > 0$ | feed: low draw: high $\Delta\pi < 0$ | feed: medium draw: medium $\Delta\pi \approx 0$ |
| Driving force | $\Delta P$ | $\Delta\pi$ | $\Delta P$ |
| Draw solute | None | Draw solution(vent) | Use of the same solute |
| Purpose of use | To produce pure water | To produce pure water | To produce a solute and pure water |
| Recovery rate | About 50% | >100% | 100% recovery of a solute and a solvent |
| Advantages | One-step process | $\Delta P = 0$, (atmospheric pressure) | $\Delta\pi \approx 0$ 100% recovery of a solute and a solvent |
| Disadvantages | High-pressure process, and low water recovery (50%) | Two-step process, regeneration of a draw solution, and penetration of a draw solution into pure water | Two-step process, $\Delta\pi \approx 0$ in concentration, and use of a low-pressure RO process for water recovery |
| Others | Use of an RO membrane | Use of an FO membrane | Use of NF for concentration, and use of an RO membrane for water recovery |
| Main use | Seawater desalination (sewage) | Seawater desalination (sewage) | Concentration of various aqueous solutions, and seawater desalination |

Currently, membrane processes are being studied to generate power by forward osmosis in addition to reverse osmosis. Thus, if these membrane processes are successfully developed, they have the potential to solve water and energy issues at the same time. If the reasons for limitation as shown in Table 2 below are technologically and economically solved, the membrane processes are expected to have a significant impact on the chemical and biological industries and environmental industries.

TABLE 2

| Material | Thermal method | Use of membrane | Reasons for limitation |
|---|---|---|---|
| Salt | Possible (up to 100%) | Up to 7% | Osmotic pressure of feed solution |
| VFA | Possible (up to 100%) | Up to 14% (forward osmosis) | Osmotic pressure of feed solution |
| Ethanol | Possible (up to 95%) | Possible only at a low concentration of 20-30% | Osmotic pressure of feed solution |

In the membrane process, the flux of a solvent (water) and the movement of a solute (salt, VFA or ethanol) are as follows:

$$Jw = Lp(\Delta P - \sigma\Delta\pi) \quad (1)$$

$$Js = Cs(1-\sigma)Jw + \omega\Delta\pi \quad ((2)$$

wherein Jw is water flux; Lp is water permeability coefficient; $\Delta P$ is the hydraulic pressure difference between a feed chamber and a draw chamber; $\Delta\pi$ is the osmotic pressure difference between the feed chamber and the draw chamber; and Js is the flux of the solute, which is divided into one caused by Jw and one caused by the osmotic pressure difference.

If Jw in equation (2) above is absent, the solute can move from the draw chamber to the feed chamber due to the osmotic pressure difference. $\sigma$ in the above equations is the reflection coefficient of the solute by the membrane. At $\sigma=1$, the solute is completely impermeable, and the osmotic pressure difference between the two chambers reaches the maximum.

Osmotic pressure is expressed by the following equation (3):

$$\pi = CRT \quad (3)$$

wherein C is concentration; R is gas constant; and T is temperature.

In addition, the Lewis equation for a solution containing a high concentration of a solute is expressed as the following equation 4 (Literature Cited: Lewis, G. N., The osmotic pressure of concentrated solutions and the laws of perfect solution. *Journal of the American Chemical Society* 1908, 30, 668-683):

$$\pi = RT/v_{sp} \ln(1-\gamma X) \quad (4)$$

wherein Vsp is the volume of 1 mole of a solvent when the concentration of a solute is 0; $\gamma$ is the activity coefficient of the solvent; and X is the molar fraction of the solute.

If 30 g/L of a solute dissolves in water, the osmotic pressure of the solute is 25.4 bar for salt, 0.01 bar for albumin, and $1.2 \times 10^{-12}$ bar for particles.

The reverse osmosis and reverse osmosis processes have an advantage in that energy is saved due to the use of membranes, but have a disadvantage in that, as concentration progresses, the osmotic pressure in the feed chamber increases so that it is impossible to further concentrate the feed solution or to increase the utility of the feed solution (Loeb, S, Loeb-Sourirajan Membrane, How it Came About Synthetic Membranes, ACS Symposium Series, 153, 1, 1-9, 1981; Loeb, S., J. Membr. Sci, 1, 49, 1976).

Although the molar fraction is used in equation (4) above, wt % and osmotic pressure will be expressed herein, because mole (g/L) or wt % is frequently used in actual practice. Although Lewis's osmotic pressure is applied to all solutes, molar concentration is hardly used, because when a solute is mixed with a solvent, the mass is preserved, but the volume is not preserved. For this reason, wt %, the Lewis equation, activity coefficient estimation or measurement is more preferably used in actual practice. Table 3 below shows osmotic pressure at the representative % of 3% NaCl to be used as a model in the $\Delta\pi=0$ process, total water amount, the amount of water per g of a solute, and the amount of power required to produce 1 m³ of water from each % aqueous solution.

TABLE 3

Data required for $\Delta\pi = 0$ process study of aqueous salt solution

| %(w/w) | Osmotic P | Water | gw/gs | (KWH/m3) |
|---|---|---|---|---|
| 1% | 7.610 | 2970 | 99.00 | 0.211 |
| 2% | 15.519 | 1470 | 49.00 | 0.430 |
| 3% | 23.743 | 970 | 32.33 | 0.659 |
| 6% | 50.467 | 470 | 15.67 | 1.400 |
| 12% | 114.606 | 220 | 7.33 | 3.181 |
| 18% | 195.746 | 136.67 | 4.56 | 5.433 |

TABLE 3-continued

Data required for $\Delta\pi = 0$ process study of aqueous salt solution

| %(w/w) | Osmotic P | Water | gw/gs | (KWH/m3) |
|---|---|---|---|---|
| 24% | 296.379 | 95.0 | 3.16 | 8.227 |
| 26.47% | 343.707 | 83.34 | 2.778 | 9.538 |

Materials that are needed by humans are present as solids, liquids and gases in the sea, land and air, and are also present as independent molecules or compounds. Desired materials can be obtained by catalytic reactions, chemical reactions, biological reactions, etc.

In order to obtain the above-described materials, the present inventor previously developed a method of concentrating a solute-containing aqueous solution using a zero osmotic pressure difference concentrator comprising a feed chamber and a $\pi$-equalizer chamber, which are separated from each other by a forward osmosis membrane and/or a reverse osmosis membrane (International Patent No. PCT/KR2014/000952). However, in the above-described technology, a portion of a concentrate is used as a draw solution, and in this case, if a small amount of a $\pi$-equalizer solution is used, there is difficulty in overcoming the high osmotic pressure difference between the feed chamber and the $\pi$-equalizer chamber. To overcome this difficulty, in the method developed by the present inventor, a method of reducing the residence time of the $\pi$-equalizer solution in the $\pi$-equalizer chamber is used. However, it was found that there is a problem in the design of the $\pi$-equalizer. Thus, a new process is needed.

Accordingly, the present inventors have made extensive efforts to solve the above-described problems, and as a result, have found that when one half of a feed solution is introduced into a feed chamber and the other half is introduced into a $\pi$-equalizer chamber, $\Delta\pi$ in equation (1) and (2) above can be removed/minimized, and thus the feed solution can be concentrated by hydraulic pressure ($\Delta P$) under a zero osmotic pressure difference condition ($\Delta\pi=0$) or low osmotic pressure difference condition, and the diluted $\pi$-equalizer solution has low osmotic pressure, and thus pure water can be recovered by reverse osmosis, whereby energy consumption and operating costs can be minimized while maximizing the concentration of the feed solution. Based on this finding, the present invention has been completed.

DISCLOSURE OF INVENTION

Technical Problem

It is an object of the present invention to provide pure water containing a very small amount of a solute by use of a method of concentrating an aqueous solution, which can minimize energy consumption and operating costs while maximizing the concentration of a solute-containing aqueous solution containing volatile fatty acids and various kinds of low-molecular-weight substances having a similar property to those of the volatile fatty acids.

Technical Solution

To achieve the above object, the present invention provides a method of concentrating a solute-containing aqueous solution in a low $\Delta\pi$ condition, the method comprising the steps of: (a) concentrating the solute-containing aqueous solution by a zero osmotic pressure difference concentrator comprising a feed chamber and a $\pi$-equalizer chamber, which are separated from each other by a reverse osmosis membrane, wherein a low Δπ condition between the feed chamber and the π-equalizer chamber is formed using one or more of (i) a (feed) input-split cascade process, (ii) a (feed) output-split counter-current process, and (iii) a nano-filtration membrane process; and (b) recovering the concentrated solute-containing aqueous solution by another zero osmotic pressure difference concentrator or reverse osmosis.

BRIEF DESCRIPTION OF THE DRAWINGS

In FIG. 1, $\hat{1}$ and $\hat{2}$ represent a normal reverse osmosis process, and $\hat{3}$ represents a zero osmotic pressure difference concentrator.

FIG. 2A shows a Feed "Input-Split Cascade" method. As shown in FIG. 2A, when a high osmotic pressure feed solution having any solute concentration is split into two halves which are introduced into a feed chamber and a π (Pai)-equalizer chamber, the osmotic pressure difference between the two chambers becomes zero (i.e., Δπ=0). When pressure is applied to the feed chamber under a zero osmotic pressure difference condition, the solution in the feed chamber is concentrated and the solution in the π-equalizer chamber is diluted, and thus the osmotic pressure difference between the two solutions may occur. FIG. 2B shows a Feed Output-Split CC (counter-current) method. As shown in FIG. 2B, when a portion of a concentrated solution (e.g., 50%) is sent to the π-equalizer chamber, the osmotic pressure difference between a feed output stream and a recycling (equalizer) stream becomes zero (i.e., Δπ=0). At this point, the two streams flow in a counter-current direction. For example, if the start concentration of the feed chamber is 6%, the final concentration of the π-equalizer stream can reach 3%. FIG. 2C indicates that when a membrane with a low solute reflection coefficient is used, a portion of the solute in the feed stream can flow into the π-equalizer stream to reduce the osmotic pressure difference between the two streams. The graphs on the right side of FIGS. 2A-2C show the osmotic pressure difference between the two chambers in the use of the three methods.

FIG. 5 shows the results of calculating flux and energy consumption according to an example of the present invention.

FIG. 6 shows the results of calculating values simulating a zero osmotic pressure difference process according to an example of the present invention.

BEST MODE FOR CARRYING OUT THE INVENTION

Figure 1:
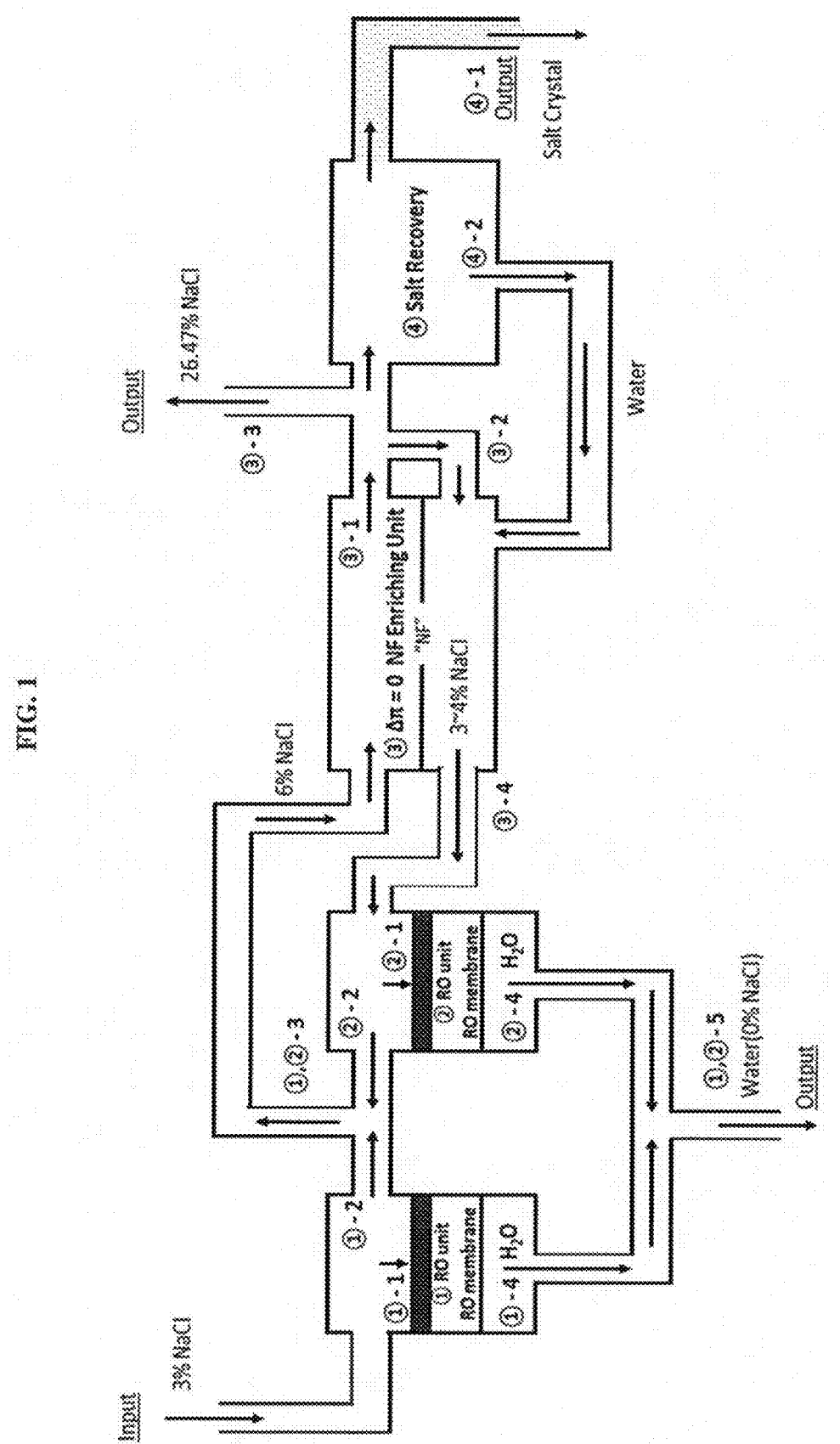
FIG. 1 schematically shows a process of separating 970 g of water and 30 g of salt from a 3% (w/w) NaCl solution in a zero/low osmotic pressure difference condition according to the present invention.

Unless defined otherwise, all the technical and scientific terms used herein have the same meaning as those generally understood by one of ordinary skill in the art to which the invention pertains. Generally, the nomenclature used herein and the experiment methods, which will be described below, are those well-known and commonly employed in the art.

It is well known that energy consumption in reverse osmosis is much less than that in a conventional multi-stage evaporation process employing heat. In addition, forward osmosis that recently started to be studied also consumes more energy than expected for regeneration of a draw solution, and causes loss of the draw solution. Thus, it is increasingly pointed out that the forward osmosis process does not have a great advantage in seawater desalination compared to the reverse osmosis process.

Contrary to seawater desalination, it may be economical to concentrate an aqueous solution containing high value-added low-molecular substances by reverse osmosis. However, in this case, equipment and energy costs are burdensome, because it is necessary to use a thermal method such as multi-stage flash (MSF) evaporation for regeneration of a draw solution.

Furthermore, in concentration of a fermentation broth, it is not difficult to concentrate 3.5% 4-fold by forward osmosis to make 14% (on a solvent basis). However, the concentration essentially required in the fermentation industry varies from 20-60 wt % of salt saturated aqueous solution in a fermentation product to a liquid having an ethanol concentration of 99.6%, but it is difficult to achieve a predetermined purpose by forward osmosis alone.

In addition, forward osmosis has disadvantages in that, because a high-concentration draw solution is used, it can diffuse into a feed chamber and mix with a feed solution, and if the solute rejection rate of the feed solution is below 100%, it is difficult to recover the solute from the draw solution.

In the present invention, water in various kinds of solute-containing aqueous solutions to be concentrated was discharged to the outside by use of a reverse osmosis separator, and the concentrated aqueous solution was introduced into the feed chamber of a concentrator comprising the feed chamber and a draw chamber, which are separated from each other by a reverse osmosis membrane or a forward osmosis membrane, and then a solution having an osmotic pressure equal to or slightly different from that of the aqueous solution introduced into the feed chamber was introduced into the draw chamber. In this case, it was found that the osmotic pressure difference between the feed chamber and the draw chamber become near zero (Δπ=0), and thus the feed solution could be concentrated even at low pressure.

In the previous patent (International Patent No. PCT/KR2014/000952) filed by the present inventor, a method of recovering salt by a thermal method was adopted, and a method of controlling the residence time of a draw solution was used to lower the osmotic pressure difference. However, in the above-described two methods, there is economical/technological difficulty in maintaining the osmotic pressure difference Δπ at a low or zero level.

In an example of the present invention, it was found that the use of a (feed) input-split cascade, (feed) output-split count-current or nano-filtration membrane process makes it possible to maintain the osmotic pressure difference between the feed chamber and the draw chamber at a low or zero level.

The present inventors have questioned the fact that the feed to the zero osmotic pressure difference concentrator should be limited to the remaining solute-containing solution from which water was recovered by reverse osmosis. Specifically, it was found that total energy consumption could be reduced while the amount of water drawn from a solute-containing solution (3%) by reverse osmosis was reduced. In addition, it could be found that even when pure 3% salt water (seawater) which has not been subjected to a reverse osmosis-pure water production process was introduced into the zero osmotic pressure difference concentrator, a solvent and a solute could be separated with high efficiency.

Therefore, in one aspect, the present invention is directed to a method of concentrating a solute-containing aqueous solution in a low $\Delta\pi$ condition, the method comprising the steps of: (a) concentrating the solute-containing aqueous solution by a zero osmotic pressure difference concentrator comprising a feed chamber and a $\pi$-equalizer chamber, which are separated from each other by a reverse osmosis membrane, wherein a low $\Delta\pi$ condition between the feed chamber and the $\pi$-equalizer chamber is formed using one or more of (i) a (feed) input-split cascade process, (ii) a (feed) output-split counter-current process, and (iii) a nano-filtration membrane process; and (b) recovering the concentrated solute-containing aqueous solution by another zero osmotic pressure difference concentrator or reverse osmosis.

The method of the present invention may further comprise step (c) of maximizing the recovery of the solute by the another zero osmotic pressure difference concentrator of step (b) by use of one or more of processes (i) to (iii).

The method of the present invention may further comprise, before step (a), a step of concentrating the solute-containing aqueous solution by reverse osmosis.

In the present invention, step (b) of concentrating the solute-containing aqueous solution by the another zero osmotic pressure difference concentrator may comprise the steps of: (i) transferring the concentrated aqueous solution into the feed chamber of the zero osmotic pressure difference concentrator, and introducing a solution, which has the same osmotic pressure as that of the concentrated aqueous solution transferred into the feed chamber, into the draw chamber, thereby forming a zero osmotic pressure difference condition between the feed chamber and the draw chamber; and (ii) applying a pressure of 0-5 atm for forward osmosis (FO) or a pressure of 10-200 atm for reverse osmosis to the feed chamber under the zero osmotic pressure difference condition to transfer water in the concentrated aqueous solution into the draw chamber, thereby further concentrating the concentrated aqueous solution.

In the present invention, when the osmotic pressure difference between a feed stream fed into the feed chamber and a $\pi$-equalizer stream fed into the $\pi$-equalizer chamber increases, the osmotic pressure difference may be reduced using (i) the input-split cascade process, (ii) the output-split counter-current process, or (iii) the nano-filtration membrane process.

As used herein, the term "(feed) input-split cascade process" or "input-split cascade process" refers to a process that transfers the further concentrated solute-containing aqueous solution to another zero osmotic pressure difference concentrator in such a manner that one half of the feed solution that is fed into the zero osmotic pressure difference concentrator is fed into the feed chamber and the other half is fed into the $\pi$-equalizer chamber, thereby forming a zero osmotic pressure difference condition between the feed chamber and the $\pi$-equalizer chamber and then concentrates the aqueous solution of the feed chamber by low pressure, and transfers the concentrated solute-containing aqueous solution to another zero osmotic pressure difference concentrator.

As used herein, the term "low $\Delta\pi$ condition" means a condition where the osmotic pressure difference between the feed chamber and the $\pi$-equalizer chamber is zero or very low. Specifically, the low $\Delta\pi$ condition in the present invention means the case in which $\Delta\pi$ is 0 or 1 to 100 bar.

As used herein, the term "(feed) output-split counter-current process" or "output-split counter-current process" may refer to a process that sends a portion of the $\pi$-equalizer stream, concentrated in the zero osmotic pressure difference concentrator, to the feed stream.

As used herein, the term "$\pi$ (Pai)-equalizer chamber" is used in the same sense as a draw chamber, and is the same as the draw chamber in that it receives a filtrate (water) from the feed stream and dilutes the filtrate, but differs from the draw chamber in that the driving force is hydraulic pressure ($\Delta P$) herein, whereas it is a concentrated draw solution of the draw chamber in forward osmosis. For reference, the present inventors tested the $\Delta P$ in forward osmosis, but the experiments were not successful in the test, because the $\Delta P$ was at most about 3 atm and the membrane was also different.

In the present invention, step (a) may apply each of steps (i) to (iii), and steps (i) and (ii), steps (i) and (iii), steps (ii) and (iii), or all of steps (i) to (iii) to form a low $\Delta\pi$ condition.

In another example of the present invention, 3% salt water was concentrated, and as a result, it was found that salt crystals and water can be obtained by the input-split cascade process and the output-split counter-current process.

Figure 2A:
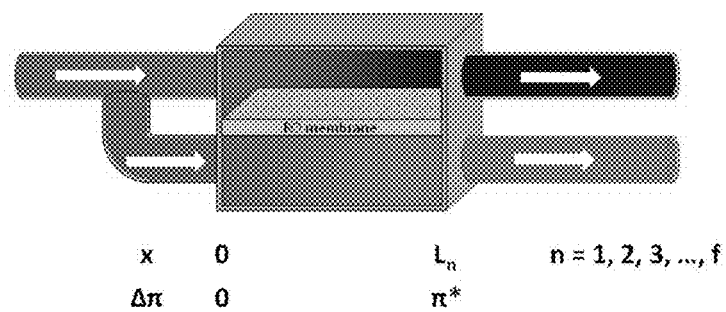
FIGS. 2A-2C schematically show three methods used to achieve zero/low osmotic pressure difference according to the present invention.
Figure 2A:
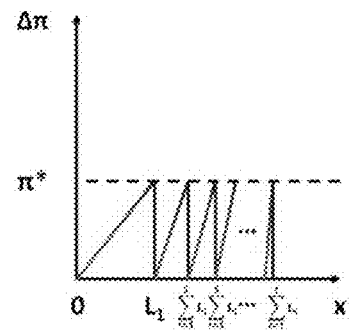

Specifically, in another example of the present invention, a process was simulated in which 3% salt water (3% NaCl solution) was completely concentrated to a crystalline form (solid) from 26.47% saturated solution by the input-split cascade process and the output-split counter-current process in reverse osmosis. The present inventors consulted with a crystallization expert and got an advice that the crystallization is possible. In the input-split cascade process (FIG. 2A), a feed is split into a feed stream and a $\pi$ (osmotic pressure)-equalizer stream in each concentration region, and a solute remains in the feed chamber. Furthermore, only the solvent water moves to the $\pi$-equalizer chamber, and thus the solution concentration of the feed chamber increases and the solution concentration of the $\pi$-equalizer chamber decreases. However, when the osmotic pressure difference ($\Delta\pi$) between the two chambers increases from 0 to any value (e.g., 60 bar), for example, 6% salt stream can be made into 9% salt concentrated stream and 3% salt diluted stream. This depends on the size ratio (A) between the two chambers and on how much water is filtered in the feed chamber (filtrate amount/feed chamber=T). Namely, when the two factors (A and T) at any concentration are adjusted, desired concentration and dilution can be achieved, and separation into water and salt can be achieved by sending the concentrated water upward and sensing the diluted water downward (see Examples 3 and 4).

Figure 2B:
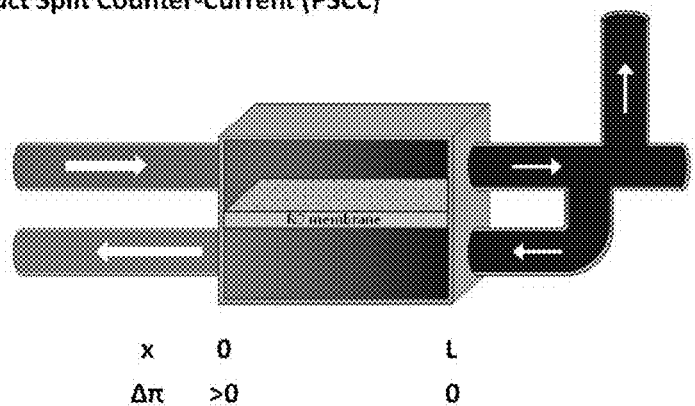
Figure 2B:
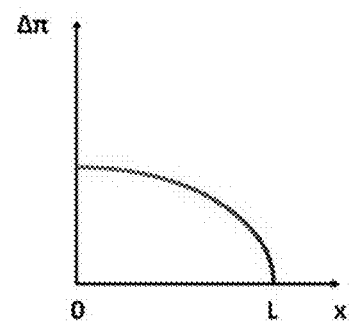
Figure 2C:
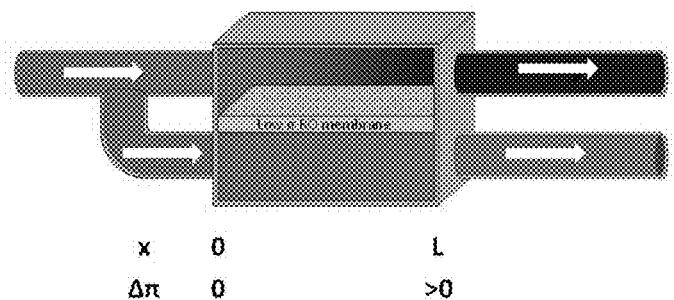
Figure 2C:
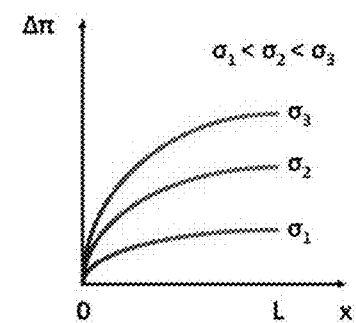

Meanwhile, in the output-split CC process (FIG. 2B), when pressure is applied to an input solution, only the solvent flows from the feed chamber into the $\pi$-equalizer chamber, and thus the input stream is concentrated from 6% to 26.47%. 50% of the finally saturated feed output stream in the feed chamber flows into the $\pi$-equalizer tank to form a zero osmotic pressure difference between the feed output and the $\pi$-equalizer input. While the $\pi$-equalizer stream flows in counter current with the feed stream, the concentration thereof decreases. When the saturated concentrated solution of the feed stream is discharged to the outside of the system, the output of the equalizer chamber can be recovered in an amount of 970-83.34=886.66. With the exception of 500 kg water recovered by RO, only 428.33 kg of water can be recovered, which has a salt concentration of 15/(15+ 428.33)=3.38%. Of course, if 470 kg of water is completely recovered by crystallization or the like, it has a salt concentration of 3.00%.

50% of water can be recovered from 3% salt input by RO, and the remaining 6% salt solution (470 L) flows into a recycle unit and recycled to a π-equalizer output while Δπ is maintained at 0 to 60 bar. Then, water is produced in a RO-2 unit, and the remainder is recycled to the feed stream. To remove 30 g of salt, recycling should be performed at least twice (see Example 5).

In the present invention, when salt is recovered, a method of using thermal or electric energy, which is well-known to a person of ordinary skill in the art, is applied to a saturated solution, or a (feed) input-split cascade process and a (feed) output-split counter-current process are applied thereto, but not limited thereto.

In another example of the present invention, it was found that when a portion of the solute-containing aqueous solution concentrated by the above-described method was recycled to the draw chamber using nano-filtration to reduce the osmotic pressure difference between the feed chamber and the draw chamber, the osmotic pressure difference decreased rapidly.

Therefore, in the present invention, a nano-filtration membrane may be used to reduce the osmotic pressure difference.

In the present invention, process (iii) in step (a) may be applied through process (i), and may be applied to process (ii) in such a manner that, considering the degree of recovery of concentrated water, the osmotic pressure difference between the feed chamber and the π-equalizer chamber, and the amount of water recovered, a membrane with high solute selectivity is disposed in the front part of the zero osmotic pressure difference concentrator, and a membrane whose selectivity decreases with an increase in the osmotic pressure difference is disposed in the rear portion of the zero osmotic pressure difference concentrator, thereby reducing the osmotic pressure difference. However, the scope of the present invention is not limited thereto.

In the present invention, pure water may be produced by using reverse osmosis (RO), and water is produced by using an RO process system.

A saturated solution concentrated by the method of the present invention can be produced by using river water or seawater, and electric power can be produced by using a pressure-retarded osmosis (PRO) power generation process.

The zero osmotic pressure difference concentrator according to the present invention may be configured in plural numbers. In other words, the feed chamber and the π-equalizer chamber constituting the zero osmotic pressure difference concentrator may be configured in multiple stages.

In the present invention, a reverse osmosis membrane or a forward osmosis membrane that separates the feed chamber and the draw chamber of the zero osmotic pressure difference concentrator from each other can be used without any particular limitation as long as it does not to allow a solute to permeate therethrough and mainly allows a solvent to permeate therethrough.

As used herein, the term "solute" refers to a liquid or solid material that dissolves in water as a solvent.

In the present invention, examples of the solute-containing aqueous solution to be concentrated include seawater, brackish water, cellular metabolites, reaction products, etc., wherein the cellular metabolites are intended to include cultures of animal cells, plant cells or microorganisms, their primary metabolites, secondary metabolites, in vitro secreted proteins, biotransformations, etc. However, those having a high osmotic pressure due to their low molecular weight are preferably used in the present invention.

Examples of the reaction solutions include chemical reaction products and enzymatic reaction products.

Examples of the primary metabolites of the microorganisms include organic acids (e.g., acetic acid, propionic acid, butyric acid, lactic acid, succinic acid and the like), alcohols (e.g., ethanol, butanol and the like), hexanes, amino acids (e.g., lysine, tryptophan and the like), vitamins, polysaccharides, and the like, but is not limited thereto.

Examples of the secondary metabolites of the microorganisms include antibiotics (e.g., penicillin and the like), enzyme inhibitors, physiologically active substances (e.g., taxol and the like), and the like, and examples of the in vitro secreted proteins of the microorganisms include enzymes such as amylases, cellulases or the like, insulins, interferons, monoclonal antibodies, and the like. In addition, the biotransformations of the microorganisms are substances produced by using microorganism or enzymes and examples thereof include steroids and the like, but are not limited thereto.

For example, when ethanol is concentrated using the method of the present invention, the concentration of ethanol that can be concentrated in the reverse osmosis concentrator (RO-1) is about 20%. Theoretically, it is known that ethanol can be concentrated to 20-100% by the zero osmotic pressure difference process. However, a membrane capable of concentrating ethanol to 91-100%, like volatile fatty acids (VFA) or salt, has not yet been developed.

Because volatile fatty acid (VFA) has a degree of saturation of about 50-60 wt %, it can be theoretically concentrated to 100%. In addition, it has a high rejection rate, and thus can be concentrated to 100% even under a zero osmotic pressure difference condition.

As used herein, the term "low solute selectivity membrane" refers to a membrane having a selectivity lower than 1 but higher than 0. Examples of the low solute selectivity membrane include, but not limited to, nano-filtration membranes.

In the present invention, when the material to be concentrated is a solid, it is preferably a material which is easily crystallized depending on temperature and pH and which is not highly viscous even at high concentrations. When the material to be concentrated is a liquid, alcohol for fuel may be a good example of the material, but is not limited thereto.

In the present invention, the aqueous solution may have a pH of 2 to 13 and a temperature at which water is maintained in a liquid state, for example, 0 to 100° C., preferably 15 to 50° C., more preferably 20 to 40° C. The temperature may be higher or lower than the above temperature. For example, a mixture of other solute/solvent may have a temperature deviating from the above temperature.

In the present invention, the solution that is introduced into the π-equalizer chamber in order to form a zero osmotic pressure difference condition between the feed chamber and the draw chamber may be a concentrated aqueous solution transferred to the feed chamber, a solution that is easily separated after use, etc. However, the solution is preferably an aqueous solution having the same composition as that of the concentrated aqueous solution transferred to the feed chamber.

In the present invention, the concentration using the zero osmotic pressure difference concentrator may be performed in a batch or continuous manner in order to maximize its effect.

The concentration may be performed in the batch manner when there is no flux between both chambers and an external system, and may be performed in the continuous manner when there is a flux between both chambers and the external system.

In the present invention, the feed chamber and the π-equalizer chamber may be configured in multiple stages.

In the present invention, the method of recovering the solute and water from the aqueous solution further concentrated in the zero osmotic pressure difference concentrator may be performed by using a multi-stage evaporation method, dialysis and evaporation, a thermal decomposition method, a sulfuric acid method, a calcium method, and an input-split cascade, and the like, which are commonly known each independently, but is not limited thereto.

The method of the present invention may further comprise step (d) of maximizing the recovery of either the solute or water by use of any one of processes (i) to (iii).

The method of the present invention may further comprise a pressure-retarded osmosis (PRO) power generation process, a resource utilization process, a rare earth recovery process and the like in order to increase the added values of the processes.

The method of the present invention may further comprise a step of optimizing mass balance and energy balance.

The present invention is also directed to a method of separating a solvent and a solute from a solute-containing aqueous solution using the above concentration method.

In the present invention, the solute may be salt (or liquid), and the solvent may be water.

EXAMPLES

Hereinafter, the present invention will be described in further detail with reference to examples. It will be obvious to a person having ordinary skill in the art that these examples are for illustrative purposes only and are not to be construed to limit the scope of the present invention.

Example 1: Method for Recovery of Water and Solute 1-1: Method for Recovery of Water When pressure is applied to 3% salt water, the flux of the water can be easily calculated as $Jw=Lp\ (\Delta P-\Delta\pi)$. As shown in Tables 1 and 4, the osmotic pressure of 3% salt water is 23.743 bar, and in this case, the minimum energy is 0.659 kwh/m$^3$. When 500 kg of water is recovered by RO, 30 kg solute (solute rejection is assumed to be 100%) and 470 kg water remain, and the solute concentration is 6%. The osmotic pressure at the 6% solute concentration is 50.467 bar, and the energy required for reverse osmosis is (23.743+50.467)/2*0.5/36=0.515 kwh as calculated using the arithmetic mean of the osmotic pressures at 3% and 6% solute concentrations.

1-2. Method of Recovering Water from Recycle Stream

For a recycle stream, recycle energy is recycled and energy is also required for RO for water recovery. Energy related to the recycle stream varies depending on the method, and when 470 L of water is 100% recovered, energy of 0.515*0.470/0.500=0.484 kwh is required. In addition, recycle energy is additionally required.

When salt is discharged as saturated solution without being recovered, 41.67 kg water and 15 kg water are discharged per water recovery step, and thus two recycle steps are required. Namely, water is recovered in an amount of 470-41.67=428.33 Kg. However, 235 kg water should be fed for second-step recycling of 6% solute solution, and thus the amount of water that can be recovered is 193.33 kg. As a result, the amount of water that is recovered by the two recycle steps is 386.66 kg. This amount is the amount recovered from 2̂ RO unit shown in FIG. 1. This is consistent with 970 kg-83.34 kg=886.66 kg (=500 kg+386.66 kg). An important principle is that the amount of water that can be recovered from the second stream is 235×2=470 kg when the product stream returned has a solute concentration of 3%, but otherwise the amount of water that can be recovered is reduced.

TABLE 4

| w/w % | mole fraction | Osmotic Pressure | Δpdiff | KWh/m3 | volume-1 | diff-Vol | diff-Kwh | cumulative-Kwh |
|---|---|---|---|---|---|---|---|---|
| 0.01 | 6.172E-03 | 7.609594 | 7.609594 | 0.211242 | 2.970E+03 | | | |
| 0.02 | 1.239E-02 | 15.51865 | 7.909054 | 0.430798 | 1.470E+03 | | | |
| 0.03 | 1.866E-02 | 23.7429 | 8.224256 | 0.659103 | 9.700E+02 | | | |
| 0.04 | 2.498E-02 | 32.29833 | 8.555461 | 0.896602 | 7.200E+02 | 2.500E+02 | 0.194588 | 0.194588 |
| 0.05 | 3.135E-02 | 41.20109 | 8.902752 | 1.143742 | 5.700E+02 | 1.500E+02 | 0.153124 | 0.347711 |
| 0.06 | 3.776E-02 | 50.46741 | 9.255329 | 1.400975 | 4.700E+02 | 1.000E+02 | 0.127317 | 0.475029 |
| 0.07 | 4.423E-02 | 60.11362 | 9.646204 | 1.668754 | 3.986E+02 | 7.143E+01 | 0.109703 | 0.584732 |
| 0.08 | 5.075E-02 | 70.15596 | 10.04234 | 1.94753 | 3.450E+02 | 5.357E+01 | 0.096927 | 0.681659 |
| 0.09 | 5.732E-02 | 806106 | 10.45464 | 2.23775 | 3.033E+02 | 4.167E+01 | 0.087249 | 0.768908 |
| 0.1 | 6.395E-02 | 91.49349 | 10.88289 | 2.539859 | 2.700E+02 | 3.333E+01 | 0.079678 | 0.848586 |
| 0.11 | 7.063E-02 | 102.8203 | 11.32681 | 2.854291 | 2.427E+02 | 2.727E+01 | 0.073604 | 0.92219 |
| 0.12 | 7.736E-02 | 114.6063 | 11.786 | 3.181471 | 2.200E+02 | 2.273E+01 | 0.068632 | 0.990822 |
| 0.13 | 8.414E-02 | 126.8663 | 12.25999 | 3.521808 | 2.008E+02 | 1.923E+01 | 0.064496 | 1.055318 |
| 0.14 | 9.099E-02 | 139.6145 | 12.74817 | 3.875697 | 1.843E+02 | 1.648E+01 | 0.061007 | 1.116325 |
| 0.15 | 9.788E-02 | 152.8643 | 13.24981 | 4.243512 | 1.700E+02 | 1.429E+01 | 0.058031 | 1.174357 |
| 0.16 | 1.048E-01 | 166.6283 | 13.76408 | 4.625603 | 1.575E+02 | 1.250E+01 | 0.055467 | 1.229824 |
| 0.17 | 1.118E-01 | 180.9183 | 14.28999 | 5.022293 | 1.465E+02 | 1.103E+01 | 0.053239 | 1.283064 |
| 0.18 | 1.189E-01 | 195.7448 | 14.82643 | 5.433875 | 1.367E+02 | 9.804E+00 | 0.051289 | 1.334352 |
| 0.19 | 1.260E-01 | 211.1169 | 15.37214 | 5.860605 | 1.279E+02 | 8.772E+00 | 0.049569 | 1.383921 |
| 0.2 | 1.332E-01 | 227.0426 | 15.92569 | 6.302703 | 1.200E+02 | 7.895E+00 | 0.048044 | 1.431965 |
| 0.21 | 1.405E-01 | 243.5281 | 16.48551 | 6.76034 | 1.129E+02 | 7.143E+00 | 0.046684 | 1.478648 |
| 0.22 | 1.478E-01 | 260.5779 | 17.04983 | 7.233643 | 1.064E+02 | 6.494E+00 | 0.045464 | 1.524113 |
| 0.23 | 1.552E-02 | 278.1947 | 17.61672 | 7.722684 | 1.004E+02 | 5.929E+00 | 0.044365 | 1.568478 |
| 0.24 | 1.626E-01 | 296.3787 | 18.18406 | 8.227473 | 9.500E+01 | 5.435E+00 | 0.043371 | 1.611848 |
| 0.25 | 1.701E-01 | 315.1282 | 18.74952 | 8.74796 | 9.000E+01 | 5.000E+00 | 0.042466 | 1.654314 |
| 0.26 | 1.777E-01 | 334.4388 | 19.31057 | 9.284022 | 8.538E+01 | 4.615E+00 | 0.041639 | 1.695953 |
| 0.264 | 1.807E-01 | 342.3186 | 7.879818 | 9.502765 | 8.364E+01 | 1.748E+00 | 0.016433 | 1.712386 |

TABLE 4-continued

| w/w % | mole fraction | Osmotic Pressure | Δpdiff | KWh/m3 | volume-1 | diff-Vol | diff-Kwh | cumulative-Kwh |
|---|---|---|---|---|---|---|---|---|
| 0.2647 | 1.812E−01 | 343.707 | 0.047215 | 0.03507 | 8.334E+01 970 | 3.005E−01 886.66415 | 0.002863 1.71525 | 1.71525 0.795682 2.51093 |
| #1 | #2 | #3 | #4 | #5 | #6 | #7 | #8 | #9 |

Table 4 above shows the results of calculating the osmotic pressure of 3% NaCl, and the description of each row in the Table is as follows.

1: w/w % is the weight ratio of salt to water. 3% salt water consists of 970 kg water and 30 kg salt.

2: mole fraction (2*NaCl/(total moles) which is used to calculate osmotic pressure.

3: osmotic pressure at each w/w %, calculated using the OLI_Analyzer software (en.wikipedia.org/wiki/OLI_Analyzer).

4: differential pressure which is used to calculate % percent osmotic pressure between % values.

5: the amount of energy required to produce 1 ton of water having unchanged salt concentration (%) from fed raw water with each salt concentration (%).

6: volume-1 is the amount of water in a solution having each salt concentration (%) (30 kg salt).

7: differential volume which is a difference in volume between regions.

8: differential energy between regions.

9: the cumulative value of #8. Energy required for concentration from 6% to 26.47% is 1.7512−0.4750=1.2402.

As a result, it could be seen that at a low salt concentration of 3%, differential energy was high due to a high water content, whereas at high salt concentrations (e.g., 25% or higher), pressure was high, but had no significant impact because the content of water was very low.

Example 2: Concentration-Dependent Flux (LMH, Liters/(m²·h) in Δπ=0 Condition

Figure 3A:
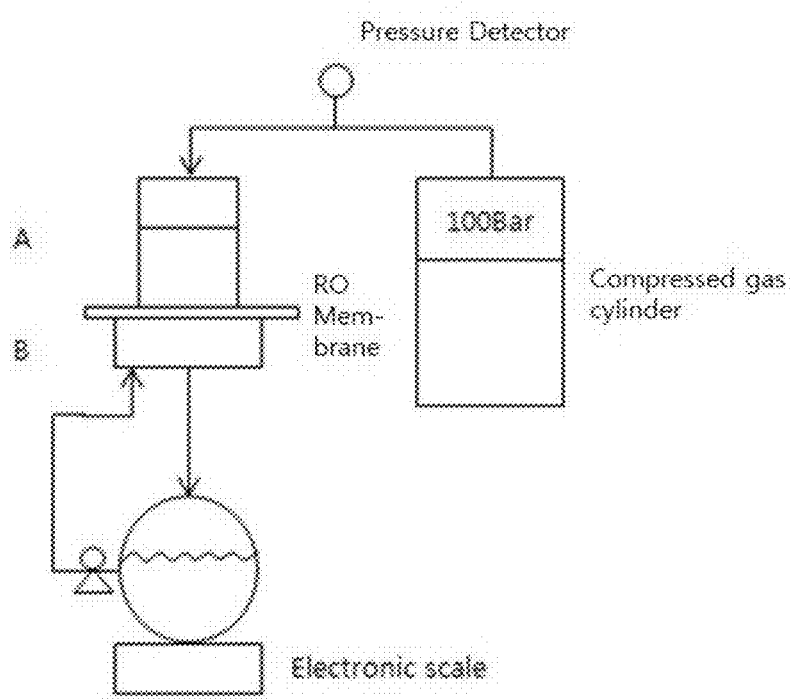
FIGS. 3A-3B show a system for measuring ΔP and permeate flux (LMH=liters/(m²·h) as a function of the concentration of a solution under a zero osmotic pressure difference condition. Specifically, FIG. 3A shows a zero osmotic pressure difference batch-type system comprising a high-pressure feed chamber A and an atmospheric pressure draw chamber B, and FIG. 3B shows specific designs of the chambers A and B.
Figure 3B:
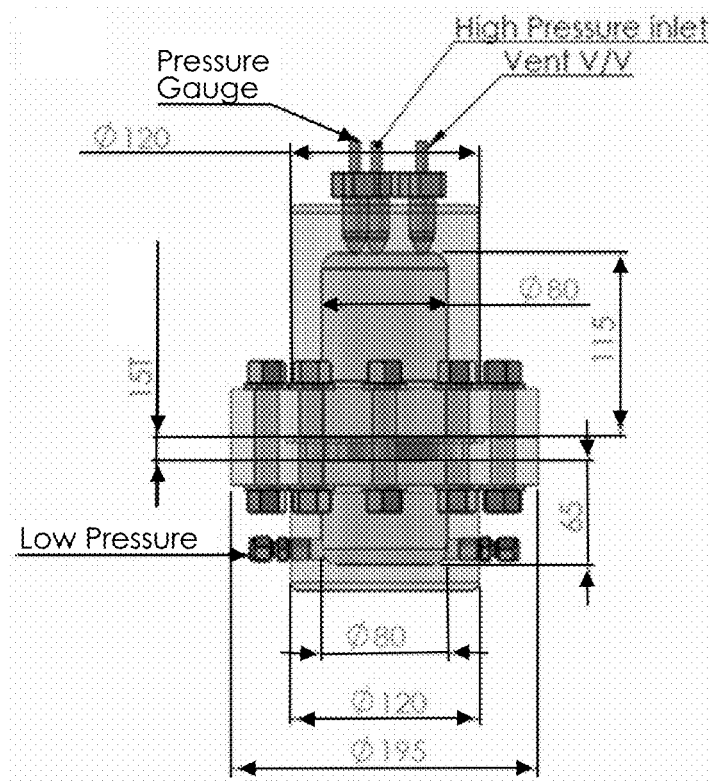

A sample (NaCl aqueous solution) was introduced into a system as shown in FIG. 3A, and pressure was applied thereto. The weight of the sample that moved from a high-pressure chamber A through an RO membrane into a chamber B (atmospheric pressure) for a given time was measured.

The membrane used in this Example was RE2521-TL (Woongjin Chemical Co, Seoul, Korea; www.csmfilter.com) which is a thin-film composite RO membrane that is used in negatively charged polyamide spiral-wound modules. It has a permeability of 1.1 m³/day and an effective area of 1.1 m². It rejects 99% of 1,500 mg/L salt solution at 1.0 MPa, and shows a maximum pressure of 4.14 MPa, a maximum flow rate of 1.36 m³/hr, and a minimum flow rate (concentrate) of 0.23 m³/hr. In addition, it has a maximum temperature of 45° C. and a pH of 3.0 to 10.0, and also can resist a pH of 2.0 to 11.0.

500 ml of an NaCl solution having the composition shown in Table 5 below was filled in each of the chambers A and B, and then an experiment was carried out. Time-dependent permeation expressed as the weight of the chamber B was monitored by a computer. For NaCl, a conductivity meter (CM-31p, TOADKK, Japan) was used, and for VFA-Na, HPLC (YoungLin, Korea) was used (Table 5).

TABLE 5

| | Pressure-dependent flux Pressure-dependent flux | | | | | | |
|---|---|---|---|---|---|---|---|
| ΔP(bar) | 1.50% | 3% | 6% | 12% | 17.72% | 22.31% | 22.77% |
| 5 | 2.44 | 0.02 | | | 0.60 | | 0.22 |
| 10 | 2.66 | 0.87 | 0.87 | | 0.84 | | 0.30 |
| 20 | 7.73 | 2.96 | 2.01 | | 1.01 | | 0.39 |
| 30 | 23.69 | 8.58 | 3.23 | 0.27 | 1.50 | 1.33 | 0.41 |
| 40 | 36.09 | 22.57 | 4.00 | 0.85 | | | |

As shown in Table 5 above, at 1.5-3% concentrations, a linear relationship appeared when the flux exceeded critical pressure, but at concentrations higher than 3%, a relationship of $(\Delta P)^\alpha (C)^\beta$ (wherein $\alpha$ is 0 to 1, and $\beta$ is −1 to 0) appeared. Namely, the flux decreased as the concentration increased, and the flux increased as the pressure increased. The maximum pressure was 40 bar.

Figure 4:
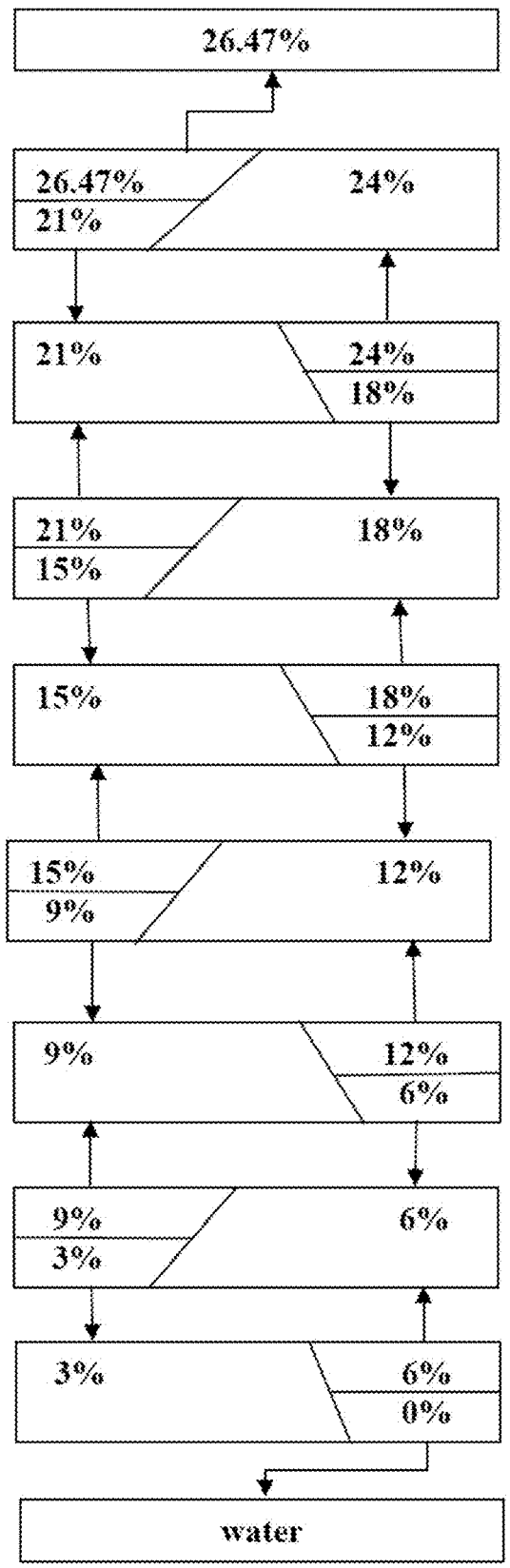
FIG. 4 shows a system capable of separating 3% NaCl solution into water and 26.47% saturated solution (or salt) by use of an input-split cascade system.

Example 3: 100% Separation of Solute/Solvent Based on Feed Input-Split Cascade Process As shown in FIG. 4, the process of the present invention can produce water from a 3% salt input stream, a lower water production system, the uppermost saturated concentrated solution or its salt.

500 L of pure water is produced from a 3% solution, and a 6% solution comprising 470 L of water (a total of 500 kg solution) enter a 6% chamber. In the 6% chamber, the solution is separated into a 9% concentrate and a 3% solution by an input-split process, and 6% enters an upper 9% chamber, and 3% enters an RO-2 unit to produce 235 kg of water. The remaining 235 kg is recycled to the chamber. The solution is concentrated in the order of 9→12→15→18→21→24→26.47% (sat.), and the diluted stream is recovered in the order of 26.47%→21%→18→15→12→9→6→3→0 (pure water).

It can be controlled by α (alpha: A) and θ (theta, T).

The process that 6% is separated into 9% and 3% is calculated as follows: A=2, T=⅓: A=feed chamber (FC)/equalizer chamber (EC), T=fraction of water moved from FC to EC. Feed input-split will allocate ⅔ of input to FC and the other ⅓ to EC. T=0.5 will move ⅓ (a half of FC) to EC. Then the water volume of FC will be ⅓ and that of EC will be ⅔. The concentration of EC will be 6%/(1−⅓)=9% while 6%/(1+2*0.5)=3%. It is possible to dispense while minimizing the osmotic pressure difference between the two chambers in this way, and ultimately, it can be seen that salt moves upward and water moves downward.

Example 4: Calculation of Energy Required for Feed "Input-Split Cascade" System 100 kg of 3% input is separated into 500 kg of pure water and 500 kg (30 kg salt+470 kg water) of 6% solution by the pure water recovery process of Example 1. It is used as a raw material for the Feed-Split Cascade system and is separated again into 9% concentrated feed solution and 3% (or 3.38%) product stream by the Feed-Split process.

The fraction of water in 500 kg of 6% input salt solution, which is filtered into a product stream by filtration, is expressed as θ ("T" for convenience), and the size ratio of the feed chamber to the product chamber is expressed as α ("A" convenience). If it is wanted to set the product stream to 9%, then 6%/(1−T)=9%, T=⅓. Although A is preferably larger for the sake of minimizing the pressure difference between the two streams, if A is set at "2.32" for convenience, the low 3% value is 3.38% and the amount of water that moved from the 6% feed input stream to the 3.38% π-equalizer stream is 176.79 kg. If the mean pressure difference is calculated to be 30 bar, the necessary minimum energy is 30*0.17679/36=0.1473 kwh. For reference, the concentration of the π-equalizer stream is 6%/(1+2.3204*⅓)=3.38%.

Regarding flux movement and energy consumption at each solute concentration, the total amount of water that moved from the feed input-split cascade through the membrane is 371 kg, and a total of 0.309 Kwh is required when the mean pressure difference is 30 bar. In addition, two recycle steps are required to remove 30 kg of salt, and thus the total amount of energy required is 0.618 kwh. The total minimum energy was found to be RO-1 energy+RO-2 energy+recycle (twice)=0.515+0.618+0.390=1.523 kwh. However, in practice, it may not be meaningful, because 9 steps of mixing and demixing occur during concentration from 3% to 26.47%, so energy loss is high. However, it can be considered if water is not completely recovered, because a significantly large amount of water can be recovered even by one or two steps.

Example 5: Simulation of Feed Output-Split Counter Current ("Output-split CC") Zero Osmotic Pressure Difference Process Unlike the input-split cascade of Example 4, in the region from feed-input to feed-output, there is no pressure release, and thus energy loss is smaller than that in the input-split cascade.

In the output-split CC zero osmotic pressure difference process, the feed input is a 6% salt solution comprising 470 L of water and 30 g of salt, and when pressure is applied to the feed chamber, the water moves to the π-equalizer chamber. R on the right side shows the percentage of salt that moves from the feed chamber end stream to the product (draw) chamber. When 50% of salt entered the product chamber, the concentration of salt in the feed chamber end is 26.47%, and the osmotic pressure difference is "0". However, the concentration of salt in the π-equalizer chamber end is 3.38%, and the amount of water recovered is 428.33 kg. This is the amount when the product is a saturated solution.

In this case, the minimum energy to resist the osmotic pressure during the first recycle step was calculated to be 0.38772*2=0.775 kwh.
The total energy is as follows:
0.515+0.775+0.390=1.680 kwh.

Example 6: Separation into Water and Concentrated Salt Water in Output-Split CC 6-1: Mass Balance and Minimum Energy in Desalination Process As shown in Table 6 below, it is assumed that 3.0 S or 3.0 Ws (26.47% saturated) of concentrated water in each of the upper and lower layers of a desalting tank is at Δπ=0. Although the start is at "0", water of 0.5 Ws moves from upper layer water to lower layer water at the end, and as a result, 0.5 S (15 g) of salt is precipitated and removed from the system, while the water becomes a form of 3.0 S or 3.0 Ws and is recycled to the lower layer water. 0.5 Ws filtered from the upper layer water moves to the lower layer water to dilute 3.0 S of salt water, and 41.67 L of 23.57% water functions to reduce the osmotic pressure difference between the lower layer water and the upper layer water (Δπ=0).

Because 15 g of salt and 41.67 g of water are removed per recycle step, two recycle steps are required for a normal state. Energy required in this case is (343.707−288.559)= 51.148, 51.148*0.04167/36=0.0638 kwh/15 kg, and 0.127 kwh is required to remove 30 kg of salt. Energy required to remove water from 26.47% solution at 343.707 bar by RO was calculated to be 343.707*0.08334/36=0.795 Kwh.

TABLE 6

| | Feed water | RO filtration | Discharge water | Remarks |
|---|---|---|---|---|
| Upper layer water (0.5S, 0.5Ws) | 26.47% (3.5S, 3.5Ws) | −0.5S ↓(precipitated) −0.5Ws ↓ | 3.0S, 3.0Ws | Recycled to lower layer water |
| Lower layer water | 23.57% (3.0S, 3.5Ws) | +0.5W | 3.0S, 3.0Ws | |

6-2: Calculation of Feed Size and Energy Consumption

As can be seen in the above-described desalination process, energy consumption significantly differs depending on the size of a sample entering the RO unit. For example, if 1 ton (970 L of water and 30 kg of salt) is removed from 100 ton of raw water, the minimum energy required may be very small. Of course, the pumping energy cannot be ignored because a large amount of water must be pumped, but the minimum energy required for separation may necessarily be small.

If 1 W of water is produced in a 7 S, 7 W system, it becomes 7 S, 6 W at 3%, and the concentration is 3.48%. The osmotic pressure difference is (27.849−23.743)=4.106 bar. The energy required in this case 4.106*0.970/36=0.110 kwh. This is about 10% of the theoretical energy (1.14 kwh) required to obtain 1 m³ of water. Although a separation tank which is about 3-fold larger than that in RO was used in the above-described desalting tank, the large separation tank required the minimum energy of 0.127 Kwh, and the desalting tank by RO required the minimum energy of 0.795 kwh.

6-3: Calculation of Minimum Energy Required to Completely Separate Water and Salt from 1 Ton of 3% Salt Water Although energy consumption when using a large separator for a feed input was only about 10% of the theoretical energy consumption, in fact the energy consumption is much related to recovery rate. In the following example, 0.250 m³ of water is recovered from 1 ton of 3% salt solution of Example 6-1 by first RO, and the remainder is recycled (0.970−0.250=0.720) so as to satisfy a mass balance and is also desalted. In the case of Example 6-2, half of water (970 kg*0.5=485 kg) is recovered by first RO, and the remainder is additionally recovered from recycled water (0.970−0.485=0.485). In the case of F500, 0.500 ton of water is recovered by first RO, and the remainder is recovered from recycled water.

The energy required to obtain pure water and salt is easily calculated, but recirculation energy is quite complex and significantly differs between the processes, and thus is compared in the following way. Although it is not an exact value because it is the arithmetic mean of the values at the start (26.47%) and the end of the "output-split CC" process, the difference between the processes is as shown in Table 7 below. The following processes all produce 30 kg of salt and 970 kg of water.

TABLE 7

Mass balance of upper and lower layer water
(EO~π-EC-Output/FI~Feed-Input)

| Process name | | EO/FI 2.04/4.00% F250 | EO/FI 3.00/5.82% F485 | EO/FI 3.09/6.00% F500 |
|---|---|---|---|---|
| | RO-1 (W) | 0.194 | 0.489 | 0.515 |
| | RO-2 (R/W) | 0.432/0.483 (0.915) | 0.444/0.488 (0.932) | 0.446/0.490 (0.936) |
| | desalting(S) | 0.127 | 0.127 | 0.127 |
| RO-1/REC/RO-2/Desalting RO energy | Total energy | 1.236 | 1.548 | 1.578 |
| | π-average | 28.020 | 36.271 | 37.502 |
| Recycle energy | Δπ-input | 8.55 | 25.05 | 26.72 |
| | WR | 720.0 | 485.0 | 470.0 |

Note:
RO-2 (0.432~recycle energy, 0.483~water recovery),
WR = water per recycle

Reference: Total energy in the F00 process: 1.020 (the RO-1 process is omitted; introduced directly into the osmotic pressure difference concentrator).

In Table 7 above, an input into each of F250, F485 and F500 RO-1 is 3% salt water, and it is the concentration of an output recovered from RO-1. As recovery decreases, the concentration is lower. As shown in F500, when 500 L is recovered from RO-1, it has 6% concentration.

The first row is the energy required to recover pure water from 3% salt water in the RO-1 unit, and RO-2 is the energy in the desalination process (3.5 S, 3.5 Ws) in which the last energy consumed in the recycle unit corresponds to F250 of Example 2.

Calculation of RO-2 was carried out in the following manner Kwh can be calculated by multiplying the pressure difference between the RO-2 input (upper layer water) and the output of lower layer water by the amount of water recycled and dividing the value by 36. Meanwhile, energy was calculated by multiplying the pressure difference between feed-output (26.47%) and lower layer water input (23.57%) by 41.67. Namely, simple recycle energy was calculated by calculating the energy difference between the first and the last of the recycle system to determine the arithmetic mean and multiplying the arithmetic mean by the total amount of water recycled. [Δπ at end (4%/3%)*Q (0.470/time)+Δπ at begin (26.47%/23.57%)]/36/2*2.

Calculation of RO-1 (4%) is carried out using the mean. The mean $(23.743+32.298)/2=28.020$ RO-1 (F250) is the product of $28.020*0.25/36=0.194$ (wherein 28.02 is the osmotic pressure difference between RO-1 tank input (3%) and output (4%)) and the amount of water recycled (0.25 m$^3$). RO-2(F250) is the cumulative amount of recycle energy $[0.171+0.063]/2*2=0.234$. As can be seen here, not only RO-1 but also RO-2 has a very great impact. The water production cost of RO-2 is the sum of the Δπ process cost and the cost required to produce water from 3% solution introduced from the raw water tank. Looking at the cumulative total of the three processes, the total amount of energy required is low (1.236) in F250, but is significantly high in F485 and F500 (1.528 and 1.540, respectively), indicating that it does not significantly differ from that in "Input-split Cascade" or "Output-split CC". Because such values are values obtained using 1 ton of solute-containing solution, the minimum energy is higher than that in a current commercial process of recovering only 50% of raw water, but the π-equalizing process using the Δπ=0 RO technology according to the present invention can be significant in that it is a process of recovering 100% of water while recovering salt at low pressure.

Example 7: Comparison of Application of Low Solute Selectivity σ Membrane in Input-Split Cascade and Output-Split CC 7-1. Importance of Process of Recovering Pure Water and Salt Using Low Solute Selectivity Membrane As can be seen from the experimental results of Example 2, the higher the concentration of the solution, the lower the flux, and the pressure cannot be increased indefinitely. Therefore, it is economically feasible to use a membrane with a low solute selectivity (ó) but a high flux. The present study is preferably carried out in the area of nano filtration, not reverse osmosis.

The purpose of this study is to improve the membrane flux by applying a low selectivity membrane to input-split cascade and output-split CC, and to save the energy required for the recycle process. For reference, it is known that currently used RO processes require 1 kwh/m$^3$ to overcome the minimum osmotic pressure difference in production of 1 ton of water, but in practice, 2 kwh is consumed in the RO process and 2 kwh is consumed in other process, and thus 4 kwh in total is consumed. It is very important to reduce the electric energy cost to a small extent, because assuming that the production cost per 1 ton of water is 1 $, the electric energy cost is 0.1 $/kWh, indicating that 40% of the water cost is the electric energy cost.

Thus, although it is true that the zero osmotic pressure difference RO process requires additional power for the concentrated water recycle process, the process of the present invention uses a reduced amount of raw water (currently, production of 1 ton of water from 2 ton of raw water; 50% utilization), and is advantageous for producing electric power by FO using highly concentrated water (saturated concentration or crystallized form), and may also be used as a cost-effective process for the production of lithium, magnesium, gold, uranium etc. contained in small amounts in seawater, compared to conventional processes. In other words, the process of the present invention can also be advantageous in terms of the utilization of concentrated water, and thus can be advantageous in terms of overall economy (RO water sales+FO (forward osmosis) power generation using a concentrated water+trace metal recovery).

7-2: Comparison of Application of Low Solute Selectivity (ó) Membrane in Feed Input-Split Cascade and Feed Output-Split CC It is assumed that A=2, and T=50% (50% of upper layer water, ⅓ of the total) move in the Feed Input-Split Cascade process of Table 8-1. The feed stream is referred to as "upper layer water" for convenience and the product (draw) stream as "lower layer water". At σ=1, the starting concentration is 6% and the ending concentration is 11.32%. The reason why the concentration of the upper layer water did not reach 12% even though 50% of the solvent moved from the upper layer water to the lower layer water is because half of the solvent (water), not half of the solution (salt+water), moved. The average concentration of the upper layer water is 8.66%, and the average concentration of the lower layer water is 4.55%. Therefore, the difference in the concentration is 4.12%. On the other hand, in the case of σ=0.5, the upper layer water concentration is 6% and the lower layer water concentration is 8.74% (average concentration: 5.29%), and the average concentration difference is 2.08%.

Table 8-2 shows the results of the A=1 and T=0.5 system for Product-Split CC. 15 g of salt is discharged from the upper layer water, and thus when two recycle steps are performed, 30 g of salt is removed from the system. At σ=1, the concentration difference is 1%, whereas at σ=0.5, the average concentration difference increases to 4.06%, indicating that the case of σ=1 is more advantageous.

This is due to the fact that the effect of the zero osmotic pressure difference appears near the beginning of the feed-stream (3%) in Input-Split Cascade and appears at the end of feed-stream in Output-Split CC.

Comparing the above two, it can be seen that input-split may be performed initially and can be converted to output-split later. It can be seen that when the low solute selectivity (e.g., σ=0.5) membrane is used, the membrane area or overall energy consumption can be reduced compared to that in the use of a high selectivity membrane (e.g., σ=1.0).

Therefore, it is preferable that in the Input-Split Cascade process, a low selectively membrane is initially used, and in the output-split CC process, a membrane with σ=0.8–0.9 is used in the initial stage, and then when the concentration is considerably advanced (e.g., about 9-12%), a membrane with σ=0.5 is used, and when the concentration is 20%, a membrane with σ=0.2–0.1. In addition, it can be seen that the use of the two processes in combination exhibits a good effect.

TABLE 8

| | (Feed) Input-Split Cascade | | | | |
|---|---|---|---|---|---|
| A = 2.0, T = 1/3 | | begin | Arithmetic mean | end | Remark* |
| σ = 1 | Upper layer water | 6%<br>2/3S, 2/3W | 8.66% | 11.32%<br>2/3S, 2/3W | 11.32% |
| | Lower layer water | 6% | 4.55% | 3.09% | 3.09% |
| | Concentration difference | | | | |
| σ = 0.5 | Upper layer water | 6%<br>2/3S, 2/3W | 7.37% | 8.74%<br>1.5/3S; 1/3W | 8.74% |
| | Lower layer water | 6% | 5.29% | 4.57% | 4.57% |
| | Concentration difference | 0% | | 4.17% | |
| Water movement amount | | 0 | | 1/3V | 156.67 |
| | Arithmetic means concentration difference | (σ = 1 − σ = 5) | 2.08% | | |

*Reference: when 50% of solution moves, the concentration of upper layer water increases 2-fold, but 50% of solvent (water) moves, and thus the concentration reaches 11.32%.
2/3 of the solution (W) to be recovered is recovered from the single stage, and the remaining 1/3 of W is discharged to the outside as upper layer water having 8.74% solute concentration. 1/3 of W can continue to be concentrated by application of the Feed Split process, and salt and water can be 100% recovered therefrom.

TABLE 9

| | (Feed) Output-Split CC | | | | |
|---|---|---|---|---|---|
| A = 1.0, T = 0.5 | | begin | Arithmetic mean | end | Remark* |
| σ = 1 | Upper layer water | 6.00%<br>1S, 1W | 9.00% | 12.00%<br>1S, 0.25 | 12.00% |
| | Lower layer water | 4.00%<br>0.5S, 9.360 | 8.00% | 12.00%<br>0.5S, 0.110 | 0.36% |
| | Concentration difference | 0 | 1.00% | 0.00% | 30-3.25 = 26.75 |
| σ = 0.5 | Upper layer water | 6.00% | 8.42 | 10.84% | 96.63R/123.37D<br>96.63R |
| | | | | 10.84% | |
| | Lower layer water | 4.15% | 4.36 | 4.57% | 4.57% |
| | Concentration difference | 1.75 | 4.06% | 6.27% | |
| Water movement amount | | 0 | | | 0.250 m³ |
| | Arithmetic means concentration difference(σ = 1.0 − σ = 0.5) | | 0.02 | | |

Example 8: Case Without R1 (Complete Recycling)

Recovery of 500 L, 485 L and 250 L from 970 L water of 3% raw water by RO in F500, F485 and F250 of Example 6 is examined. Then, the extreme situation RO-1 is "zero", and complete recycling will now be examined.

A feed input having a salt concentration of 3% is 970 L water+30 kg salt, and the recycle stream in the π-equalizer chamber is 970 L water+15 kg salt and has a salt concentration of 1.52%. The osmotic pressure at 3% concentration is 23.743 bar, and the osmotic pressure at 1.52% concentration is 11.746 bar. The difference between the two osmotic pressures is 11.997 bar, and the average of the two osmotic pressures 17.744 bar. Energy for the feed input (3%, 970 L) and the equalizer (1.52%, 970 L) is 11.99*0.970/36=0.323, and energy for the end (26.47%, 23.57%) is 0.107, and thus mean(½)*2=0.430. The energy required for RO is calculated to be 17.744*0.485/36*2=0.463 kwh.

The total energy is 0.430+0.463+0.127=1.020 kwh. The pressure difference of the input is 11.997 bar, and the pressure difference between the end of the input (26.47%) and the start of the π-equalizer is about 55.148 bar. The high pressure in the intermediate process is not a significant problem because there are many solutions such as a low σ membrane or input-split cascade.

As a result, it can be seen that when a 1.5% salt output is obtained from a 3.0% salt input, water can be obtained from seawater even at pressures of about 20 to 30 bar. When the π-equalizer stream (1.5%) is fed again into the zero osmotic pressure difference concentrator, the π-equalizer output is 0.75% recycle energy-0.157+0.107 (0.264), and RO-2-0.311+0.129=0.704. The pressure difference is 5.85 bar, and the pressure required for water production is 11.56 bar. Due to recycle, the total minimum energy decreases from 1.020 to 0.704. Reverse osmosis operable at 20-30 bar is also possible.

In summary, considering how much about 3 kwh (which is additionally required in addition to the minimum energy (0.985) in current RO processes (70/50 bar·46.50%, 0.985), F250 (50/32.29 bar, bar 수율 100%, 1.236), F00-3%/1.5% (35/23.74 bar, yield 100%, 1.020), F00-1.5%/0.75%) (20/11.56 bar, 100%, 0.704+1.020=1.724) decreases as the operating pressure of the whole process changes from 70=>50=>35>20, an appropriate optimized operation method will be derived.

Since calculation errors are likely to occur, specific methods are described below.

General calculation method (F250): (1) Calculation for water is first carried out. The salt concentration of the RO-1 feed input is always 3%. The salt concentration of the RO-1 unit output depends on the degree of drawing. If not drawn ("0"), the salt concentration of the RO-1 output is 3%. If 250 W (250 kg water) is drawn from the RO-1 input (1 ton, 1000 kg, 30 S, 970 W), the RO-1 output becomes a 750 kg solution (30 S, (970-250)=720 W, 30/(30+720)=4%) which is used as an input into the Δπ-recirculation unit.

Energy calculation: When the average osmotic pressure at the beginning and the end of the case where the concentration of salt water changes from 3% to 4% is calculated, the energy require is 28.020*0.250/36=0.194 (Kwh). It is to be understood that the average pressure at the two concentrations and the pressure difference are used twice. For RO-1, only the average of the pressures at 3% and 4% is used. For recirculation energy, both the average of the pressures at 4% and 2.04% and the pressure difference are used.

(2) Recirculation energy is calculated.

In Δπ-recirculation, the whole (970 W upon salt recovery) or a portion (excluding concentrated water; 970-83.34=886.66 W) of the feed stream π-equalizer chamber is recycled to the E-chamber. Namely, there are 970 W/886.66 W and salt 30 S. After it is concentrated, it is divided into halves and discharged to the outside, or salt is recovered as crystals.

Assume that the input into the π-equalizer chamber comprises 15 S and 41.67 W (½ of the concentrated water component) and has a salt concentration of 23.57% (Example 6). The salt concentration of the output is 15/(15+720)=2.04% since all the water was recovered. The difference between the pressures at 4% and 2.04% is 16.279, and the energy required is calculated to be 16.279*0.720/36=0.3251 kwh.

Since the energy for the π-equalizer-chamber input is 0.107, 30 S is removed by two recycle steps. That is, (0.325+0.107)/2*2=0.432 Kwh.

(3) Calculation for RO-2 is carried out. In this case, since 360 W is produced in each step, the average (24.150) at 4% and 2.04% is required. The water production energy required for two recycle steps is (32.298+16.019)/2*0.360/36*2=0.483, and the total is 0.194+0.433+0.483+0.127=1.236. In summary, for calculation for RO-1, only the average (3% and 4%) is required, and for the recirculation process, both the pressure difference and the average are required, in which the pressure difference is used for the calculation of recirculation energy, and the average can be used for calculation of the water production energy required in RO-2.

Example 9: Application of Zero Osmotic Pressure Difference Technology to Fuel Alcohol Ethanol for fuel is currently being used with a purity of 99.5% or 99.6%. There is a thermal method (gas is used to generate steam, and electricity is used), and the minimum energy usage in recent years is as follows. According to the US Renewable Fuels Association (Mar. 6, 2016), the minimum energy is 23,424 BTU/gal as described in the Iowa WDG data. It corresponds to 2.27 kwh/kg-ethanol. Concentrating ethanol to 99.5% by application of the zero osmotic pressure difference technology will now be examined.

Table 10 below shows the results of calculating the osmotic pressure by the Lewis equation (equation 4). The osmotic pressure is 28 bar in 5% ethanol, but increases to 6010 bar in 99.50% ethanol. Unlike high pressures, the volume at high pressures is very minimal, and thus the energy content is very low. Like the case of 3% NaCl, most of the energy content is concentrated at low concentrations.

TABLE 10

| %(w/w) | Ethanol-g | Water | Osmotic pressure (bar) |
|---|---|---|---|
| 5% | 50 | 950.00 | 28.05 |
| 7% | 50 | 664.20 | 39.94 |
| 10% | 50 | 450.00 | 57.79 |
| 20% | 50 | 200.00 | 128.42 |
| 40% | 50 | 75.00 | 318.90 |
| 60% | 50 | 33.33 | 635.40 |
| 80% | 50 | 12.50 | 1296.20 |
| 90% | 50 | 5.55 | 2076.20 |
| 94% | 50 | 3.19 | 2702.90 |
| 99.50% | 50 | 2.63 | 6010.00 |

In the same manner as the case of 3% NaCl, the energy required for concentration of ethanol can be calculated. The energy required for concentration is 0.08819 kwh/kg for 5%

99.5%, 0.0373 kwh/kg for 10%→99.5%, and 0.04787 kwh/kg for 7%→99.5%. The minimum energy required for concentration from 5% to 99.5% is 4.4093 kwh, and dividing this minimum energy value by alcohol content can produce the above-described value. The energy required for 5% is 4.4094/50=0.08819 kwh/kg.

The process of the present invention will now be compared with a thermal concentration process which is known to be currently feasible and effective. The energy shown in the following website is 2.27 kwh/kg: www.ethanolproducer.coicles/13134/rfa-analysis-finds-improvement-of-corn-ethanol-net-energy-balance Accessed on Jul. 17, 2016 Iowa WDG(lowest energy consumption)=23,428 BTU/gal=23, 428/3,412 BTU/(3.785*0.8) (kwh/kg).

Meanwhile, the minimum energy required to concentrate ethanol (e.g., 7 wt % ethanol) to 99.5% by RO is 3.389 kwh, to which 3 kwh is added to make 6.389 kwh/70 kg=0.091 kwh/kg.

The total thermal energy is equal to 24.94 times that of the osmosis process (2.27/0.091=24.94). Given that the osmotic pressure of 99.6% ethanol is 6000 bar as shown in the above example, using the zero osmotic pressure difference technology can control the osmotic pressure at a pressure level (e.g., 100 bar or less) that we can afford. In addition, the use of a membrane in combination with the zero osmotic pressure difference technology makes it possible to avoid the azeotropic phenomenon between water and ethanol.

Example 10: Production of Li, Mg, Gold and Uranium from Water Concentrated by RO Under Zero Osmotic Pressure Difference Condition According to Google image: seawater desalination marker accessed on Jul. 24, 2016), the total global desalination market reaches 60 million dollar in 2016. The present inventors conducted an economic evaluation of seawater desalination equipment (65,000 tons/day) in Gijang-gun, Busan, Korea. The economic evaluation was conducted based on the current international price of each element based on the calculated value of water sales price ($1 per ton).

As shown in Table 11 below, most of the elements are so small that they are far less than water sales prices, but Mg, salt, etc. are worth reviewing. The technology of the present invention will be advantageous compared to other processes because the concentration of water concentrated by the technology is at least 10 times higher than that of seawater or 5 times that that of current RO effluents.

TABLE 11

Calculation of costs for producing useful substances from concentrated water

|  | Content (kg/kg) | Total production | Unit cost $/ ton | gross sales | Water sales prices Ratio |
|---|---|---|---|---|---|
| Water |  | 2.37E | 1 | 2.37E+07 | 1 |
| Li | 1.74E−07 | 8.26E00 | 6.00E+03 | 4.95E+04 | 2.08E−03 |
| Mg | 1.29E−03 | 6.13E+04 | 2.00E+03 | 1.23E+08 | 5.17E+00 |
| U | 9.34E−09 | 4.44E−01 | 2.00E+05 | 8.87E+04 | 3.74E−03 |
| Au | 4.00E−11 | 1.90E−03 | 4.20E+07 | 7.98E+04 | 3.37E−03 |
| NaCl* | 3.00E−02 | 4.75E+07 | 2.00E+01 | 9.49E+08 | 4.00E+01 |

Total amount of seawater used (65,000 ton/d)
(seawater desalination equipment in Gijang-gun, Busan, Korea)

2.37E+07 annualy   4.75E+07

*3% content

INDUSTRIAL APPLICABILITY

The method of concentrating an aqueous solution by low pressure under a zero osmotic pressure difference condition according to the present invention has advantages in that energy consumption is low, and an aqueous solution can be concentrated until it can reach the maximum solute concentration or a solute concentration of 100%, without having to use an extraction solvent. In addition, there is an advantage in that the need to use a separate osmotic pressure draw solution is eliminated.

Although the present invention has been described in detail with reference to the specific features, it will be apparent to those skilled in the art that this description is only for a preferred embodiment and does not limit the scope of the present invention. Thus, the substantial scope of the present invention will be defined by the appended claims and equivalents thereof.

The invention claimed is:

1. A method of concentrating a solute-containing aqueous solution in a low $\Delta\pi$ condition, the method comprising the steps of:
   (a) concentrating the solute-containing aqueous solution by a zero osmotic pressure difference concentrator comprising a feed chamber and a $\pi$-equalizer chamber, which are separated from each other by a reverse osmosis membrane, wherein a low $\Delta\pi$ condition between the feed chamber and the $\pi$-equalizer chamber is formed using a (feed) output-split counter-current process; and
   (b) recovering the concentrated solute-containing aqueous solution by another zero osmotic pressure difference concentrator or reverse osmosis,
   wherein step (b) of concentrating the solute-containing aqueous solution by the another zero osmotic pressure difference concentrator comprises the steps of:
   (i) transferring the solute-containing or concentrated aqueous solution into the feed chamber of the zero osmotic pressure difference concentrator, and introducing a solution, which has the same osmotic pressure as that of the concentrated aqueous solution transferred into the feed chamber, into the $\pi$-equalizer chamber, thereby forming a zero osmotic pressure difference condition between the feed chamber and the $\pi$-equalizer chamber; and
   (ii) applying a pressure of 10-200 atm for reverse osmosis to the feed chamber under the zero osmotic pressure difference condition to transfer water in the concentrated aqueous solution into the $\pi$-equalizer chamber, thereby further concentrating the concentrated aqueous solution.

2. The method of claim 1, further comprising step (c) of maximizing the recovery of the solute by the another zero osmotic pressure difference concentrator of step (b) by use of one or more of processes (i) to (iii):
   (i) a (feed) input-split cascade process;
   (ii) a (feed) output-split counter-current process; and
   (iii) a nano-filtration membrane process.

3. The method of claim 2, further comprising step (d) of recovering the solute from the concentrated solute-containing aqueous solution by using thermal energy, electric energy or pressure.

4. The method of claim 1, further comprising, before step (a), a step of concentrating the solute-containing aqueous solution by reverse osmosis.

5. The method of claim 1, wherein the reverse osmosis membrane is a nano-filtration membrane.

6. The method of claim 1, wherein the output-split counter-current process in step (a) comprises sending a portion of the π-equalizer stream, concentrated in the zero osmotic pressure difference concentrator, to the feed stream.

7. The method of claim 1, further comprising a pressure-retarded osmosis (PRO) power generation process, or a rare earth recovery process.

8. A method of separating a solvent and a solute from a solute-containing aqueous solution using the method of any one of claims 1-4, 5-6, and 3-7.

9. The method of claim 8, wherein the solute is salt or liquid, and the solvent is water.

\* \* \* \* \*